United States Patent [19]
Rogers et al.

[11] Patent Number: 5,978,774
[45] Date of Patent: *Nov. 2, 1999

[54] ELECTRONIC REGISTRATION SYSTEM FOR PRODUCT TRANSACTIONS

[75] Inventors: Philip Michael Rogers, Woodinville; Peter Joseph Junger, Redmond, both of Wash.

[73] Assignee: Nintendo of American Inc., Redmond, Wash.

[*] Notice: This patent is subject to a terminal disclaimer.

[21] Appl. No.: 09/314,023

[22] Filed: May 19, 1999

Related U.S. Application Data

[63] Continuation of application No. 08/725,259, Oct. 2, 1996.

[51] Int. Cl.$^6$ ............................................. G06F 17/60
[52] U.S. Cl. ............................ 705/24; 705/22; 235/385
[58] Field of Search ............................ 705/21, 22, 23, 705/24; 235/375–385

[56] References Cited

U.S. PATENT DOCUMENTS

| | | |
|---|---|---|
| 4,563,739 | 1/1986 | Gerpheide et al. . |
| 5,159,560 | 10/1992 | Newell et al. . |
| 5,216,612 | 6/1993 | Cornett et al. . |
| 5,256,863 | 10/1993 | Ferguson et al. . |
| 5,257,741 | 11/1993 | Rode et al. . |
| 5,311,424 | 5/1994 | Mukherjee et al. . |
| 5,478,890 | 12/1995 | Montanari et al. . |
| 5,602,377 | 2/1997 | Beller et al. . |
| 5,745,036 | 4/1998 | Clare . |

OTHER PUBLICATIONS

Nintendo Point of Purchase Mail–In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.
Dilger, Karen A., "The Other Direction," *Manufacturing Systems*, v. 15, n. 10, pp. 12–13 (Oct. 1997).
"Computer City Moves to Consolidate Returns," *Computer Retail Week*, v. 6, n. 125, 2 pages (Jan. 22, 1998).
Dreamcom web page print out, www.dreamcomdirect–com/RMA.htm (May 25, 1997).

*Primary Examiner*—Eric W. Stamber
*Assistant Examiner*—Hani M. Kazimi
*Attorney, Agent, or Firm*—Nixon & Vanderhye P.C.

[57] ABSTRACT

An electronic registration system which facilitates authorized product returns and reduces the incidence of improper returns. A retailer sales associate is prompted to enter individual product identification information such as an individual serial number. This individual product identification information is then stored in a data base along with the date on which the product was sold and an appropriate UPC code, SKU number or manufacturer code. A check digit algorithm may be used to verify the serial number prior to storage. A sales receipt may be imprinted with at least the date of the transaction and the serial number. When a product is returned, the retailer may cross-reference the serial number on the product with that on the receipt to verify the sales receipt. Otherwise, the database may be searched for pertinent sales information.

58 Claims, 6 Drawing Sheets

STORE•MART

SUPERCENTER

WE SELL for LESS

STORE # 100
ARLINGTON, VA

ST# 0100 OP# 00000104 TE# 30 TR# 05900

| SERIAL #    G739775156 |

VIDEO SYSTEM 004549671003 W    42.96 J
                      SUBTOTAL    42.96
          SALES TAX 1              3.01
                         TOTAL    45.97
                     CASH TEND    50.00
                    CHANGE DUE     4.03

TC # 6117107432167
* SAVE RECEIPT FOR REFUNDS / EXCHANGES *
*     OF WARRANTY ITEMS PURCHASED      *
THANK YOU FOR SHOPPING WITH US

| 12 / 14 / 95        13 : 37 : 25 |

Fig. 3

Customer Service Desk
Product Returns

ELECTRONIC REGISTRATION SYSTEM FOR PRODUCT TRANSACTIONS

CROSS-REFERENCE TO RELATED APPLICATIONS

This application is a continuation of application Ser. No. 08/725,259 filed Oct. 2, 1996, now allowed.

BACKGROUND OF THE INVENTION

1. Field of the Invention

The present invention relates to an electronic system for registering product transactions. More particularly, the present invention relates to an electronic registration system which facilitates compliance with return policies and is usefull in reducing improper or fraudulent product returns under warranty.

2. Related Art

Manufacturers and retailers of consumer products often have a standard return policy. For example, a retailer return policy might allow a consumer to return a purchased product for any reason within a certain number of days (e.g., 10 days) after purchase. Additionally, a manufacturer's warranty may permit return of defective products within a particular time period (e.g., 90 days) after purchase, and provide for repairs of defective products within a different time period (e.g., 180 days). Repairs of products after that date would be the responsibility of the consumer. Such return policies are intended to ensure consumer satisfaction while protecting the manufacturer and/or the retailer from improper returns. As a result, a delicate balance must be maintained between protection of the retailer or manufacturer and consumer satisfaction.

Unfortunately, it is often difficult to monitor product returns to ensure proper compliance with a return policy. For example, a consumer who received a product as a gift usually will not have a sales receipt. In such a situation, an uninformed decision must often be made to accept the return or not. If the return is not accepted, the consumer might unfairly be denied a proper return, and the retailer and the manufacturer risk suffering a loss of goodwill. On the other hand, if the return is accepted, the retailer and/or the manufacturer will incur expenses or losses which might be unwarranted. Some retailers seek to minimize the effect of possible improper returns by limiting a consumer to store credit (rather than a refind) or exchanges on items returned without a receipt. This alternative, however, may be unacceptable to a consumer and does not completely eliminate the retailers' exposure to improper returns.

Difficulties associated with returns made without a receipt stem primarily from the inability of the retailer to obtain purchase information (such as sales date, place of purchase, etc.) concerning the individual item for which a return is sought. Without such information, it is usually impossible for the retailer to determine whether the return is in compliance with the return policy.

In addition to the foregoing, fraudulent returns can cost product retailers and manufacturers significant sums of money. As an example, upon release of the Super Nintendo Entertainment System (Super NES), Nintendo experienced a high volume of returns of basic NES hardware. When the returned products were evaluated, it was discovered that a high percentage of the products were not defective and, in fact, were several years old. Thus, customers were abusing the retailer's return policy to exchange old products and upgrade to the new system. Such abuses increase costs to the retailers and manufacturers. These costs are often passed on to purchasers without any attendant benefit to legitimate consumers.

Prompt and efficient handling of returns and proper enforcement of return policies helps to keep down costs while maintaining consumer confidence and satisfaction. However, efforts to speed handling or improve enforcement lose their value if the expense of those efforts outweighs the accompanying benefit. Accordingly, such efforts must be efficient to benefit the manufacturers, retailer and the consumer.

Accordingly, there is a need for a system which facilitates authorized product returns yet reduces the incidence of unauthorized returns. Additionally, there is a need for a registration system which minimizes costs associated with returns, improves retailer efficiency in handling product returns, increases overall customer satisfaction, and provides retailers with immediate access to purchase data information. It is a primary object of the present invention to satisfy these needs. A further object of the present invention is to enable retailers to more effectively enforce retailer and/or manufacturer return policies, even in situations in which the product was received as a gift or when the customer no longer has the sales receipt.

BRIEF SUMMARY OF THE INVENTION

The present invention achieves these and other objects by providing an electronic registration system which enables individual product identification information to be gathered at the point of a transaction for inclusion in one or more transaction databases. In an example embodiment of the present invention, individual product identification information (such as a serial number) is stored in a local transaction database along with additional information including at least the date of the transaction. A transaction receipt such as a customer sales receipt is created and includes the individual product identification information and the date of the transaction. Additionally, the individual product identification information and the transaction date may be communicated to a separate location for inclusion in a general transaction database. The local transaction database may include, for example, sales made by a particular store or sales made by several affiliated stores and is not necessarily co-located with the point of sale.

Where a serial number is used to identify the individual product, a check digit may be used in conjunction with the serial number. In this way, the validity of the serial number may be verified and, if it is invalid, a system operator may be prompted to re-enter the serial number. The serial number may be scanned, entered with a keypad, or input with any other suitable technique.

Prior to obtaining individual product identification information, the electronic registration system may identify the type of product by evaluating, for example, the product SKU number derived from a universal product code (UPC). In this example, the individual product identification information is obtained only if the product is of a type for which electronic registration is desired.

The point of transaction information including the individual product identification information and the transaction date may be communicated for use in a general database in a number of different ways. For instance, an electronic link to the location of the general database may be established or information may be recorded and physically transferred to that location. The communications may occur periodically, on an item-by-item basis, or otherwise.

When a customer returns a product with a receipt, a retailer may look at the serial number on the receipt and compare it to the returned product. If the serial numbers match and if all other return conditions are met, the return may be accepted. When a customer returns a product with no receipt, or a receipt that does not have a correct serial number, the retailer may search the local database for sale information concerning the specific item being returned. If no sale information is located (for instance if another retailer sold the product), the general database may be accessed and searched for sales information, and the return handled accordingly.

BRIEF DESCRIPTION OF THE DRAWINGS

The objects, features, advantages and characteristics of the present invention will become apparent from the following detailed description of exemplary embodiments, when read in view of the accompanying drawings, in which:

FIG. 3 illustrates an example transaction receipt which reflects a product serial number and a transaction date;

DETAILED DESCRIPTION OF PREFERRED EMBODIMENTS

The present invention is described in the context of particular exemplary embodiments. However, it will be recognized by those of ordinary skill that modification, extensions and changes to the disclosed exemplary embodiments may be made without departing from the scope and spirit of the invention. For instance, although the invention is described primarily in the context of a retailer/manufacturer situation, the features, characteristics and advantages of the present invention could likewise be applied to a store/headquarters situation or a retailer/distributor situation. In short, the present invention is not limited to the particular forms disclosed.

Figure 1:
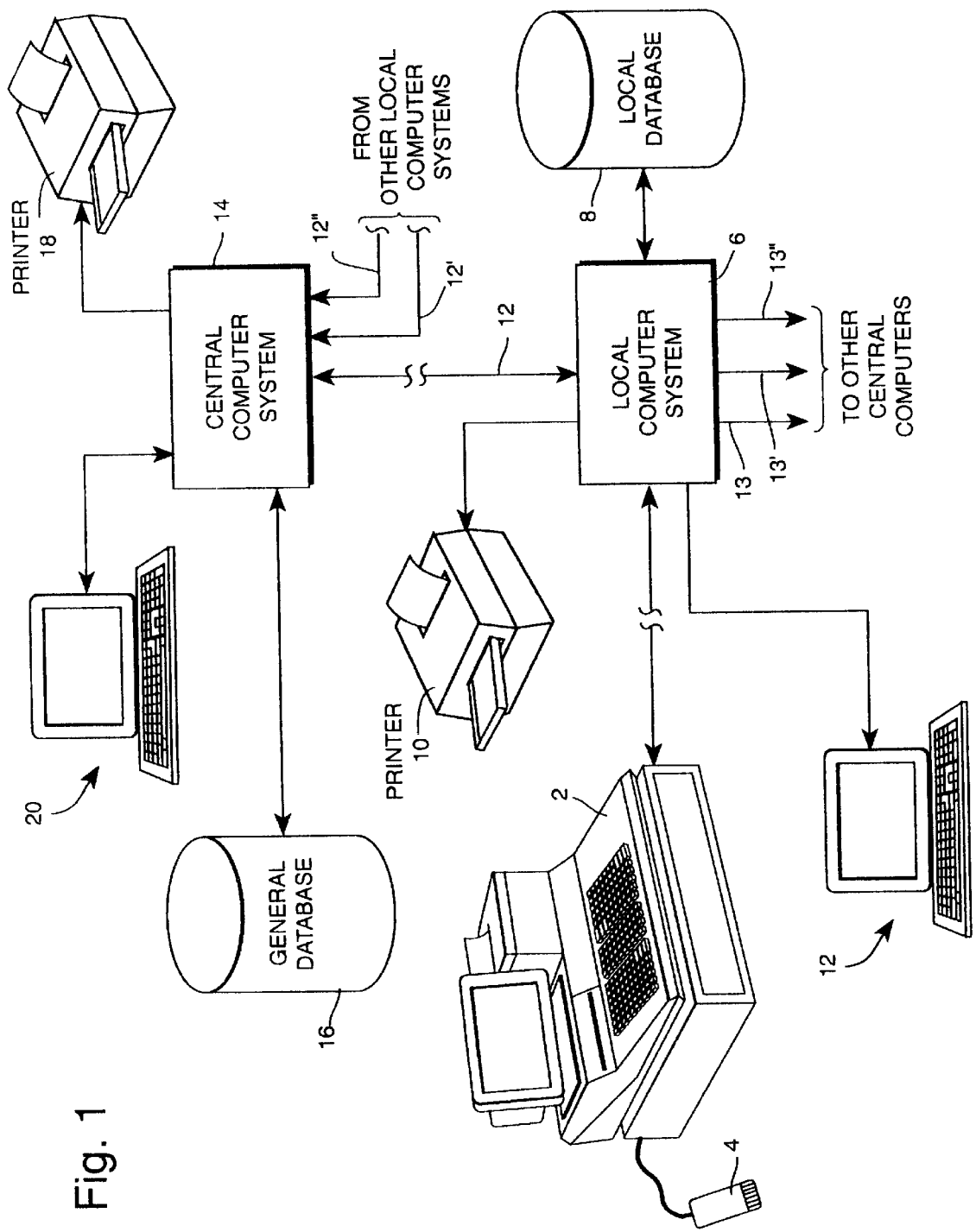
FIG. 1 is a schematic block diagram illustrating an example of an overall electronic registration system in accordance with the present invention.

An example of an electronic registration system in accordance with the present invention is illustrated in FIG. 1. Briefly, the example system may include a point of sale register 2 and an associated bar code scanner 4. The register 2 is preferably connected with a local computer system 6 in a suitable manner. For example, the register 2 may be "hard-wired" to the local computer system 6. Alternatively, the register 2 and the local computer system 6 may communicate, for example, through modems and telephone lines, or over radio communication channels. Any appropriate communication channel may be used.

In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer.

The local retailer computer system includes an associated local database 8 for storing registration information. Additionally, a local printer 10 and an operator terminal 12 may be provided. The operator terminal may be used, for example, by a store clerk upon return of merchandise to locate pertinent sales information in the local database 8. The printer 10 may be used to produce hard copies of end of day sales reports and the like.

In the exemplary embodiment, a communication channel 12 is provided between the retailer computer system 6 and a central computer system 14. The central computer system may, for example, be a manufacturer computer system. Alternatively, the central system could, for example, be a regional computer system for a large chain of stores, a distributor computer system or the like. It should be appreciated that the term communication channel is used herein in its broadest sense, and includes any suitable technique for passing electronic information between systems. Such suitable techniques include, for example, electronic links via modem, radio links, or even communications established by physically transporting a recording medium, such as a magnetic disk, magnetic tape or optical disk, from one system to the other. In the preferred arrangement, an electronic link may be established by modem over available commercial telephone lines.

A general database 16 is associated with the central computer system 14 for storing transaction information from a plurality of retailer computer systems 6. Additionally, a printer 18 and an operator terminal 20 may be included with the central computer system 14.

As illustrated in FIG. 1, the central computer system 14 may have a number of additional communications links 12', 12", etc. for receiving information from other local computer systems. Thus, for example, a manufacturer may receive information from a number of different retailers. Additionally, the local computer system 6 may include a number of additional communication channels 13, 13', 13", etc. for connecting with other central computer systems. Accordingly, an individual retailer can electronically register products from a number of different manufacturers.

For convenience, the multiple communication channels in FIG. 1 are illustrated with separate lines. It should be noted, however, that separate lines are not necessary. For example, the local computer system 6 more likely would have a single communications line, and connection with the particular central computer system 14 would be made through a modem by dialing the appropriate telephone number.

Figure 2:
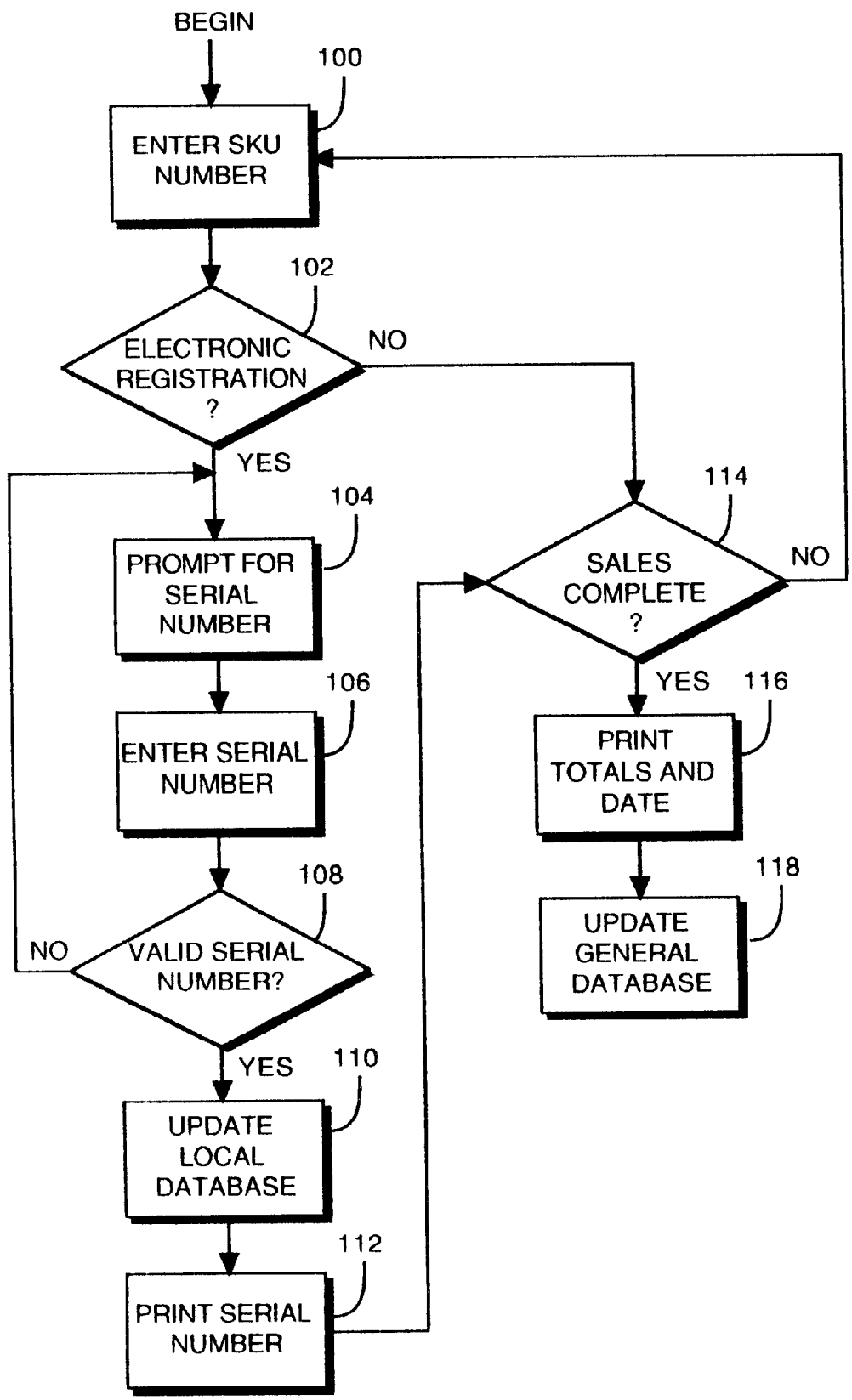
FIG. 2 is an example flowchart illustrating a series of steps that may be performed at a point of sale for registering a product transaction in accordance with the present invention.

An example of the operation of the system illustrated in FIG. 1 is described in connection with FIGS. 2–6. Referring now to FIG. 2, the electronic registration process begins when a customer brings merchandise to the register 2 for check out. The sales clerk enters the SKU number which identifies the type of product involved in the transaction (e.g., Super Nintendo Entertainment System, Game Boy, Virtual Boy, Nintendo N64, etc.) by, for example, scanning a UPC product code included on the product packaging (block 100). Of course, key entry or another technique for entering the SKU number may be used.

Electronic registration might not be necessary for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired (block 102). If so, the store associate is prompted to enter the serial number of the individual item (block 104).

The serial number may be entered (block 106), for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry, may also be used. Because the serial number is unique to each individual product, it acts as individual production identification information.

Once the serial number is entered, a check may be made to ensure that the serial number is valid (block 108). If not, control returns to block 104, and the store associate is again prompted to enter the serial number. This is repeated until a valid serial number is obtained. It may be desirable to provide store managers with the ability to override the requirement to enter a serial number in a limited number of situations. If such an ability is given, however, the overrides should be monitored to ensure the ability is not abused. This may be done, for example, by generating a periodic report listing all overrides by individual managers.

Several different techniques may be used to evaluate and verify the validity of the serial number. In one preferred technique, a check digit is added to the serial number. Such a technique may utilize a predetermined mathematical operation performed on the digits of the serial number. If the result of the predetermined mathematical operation is equal to the check digit, the validity of the serial number is verified.

An example of a check digit technique will be described in connection with an eight-digit serial number. A predetermined mathematical operation associated with the check digit may be to multiply the sum of the first four digits of the serial number of by two (2), multiply the sum of the last four digits by three (3), and sum the resulting products. This may be expressed in equation form as:

$$2(N_1+N_2+N_3+N_4)+3(N_5+N_6+N_7+N_8)$$

where $N_1$ is the first digit of the serial number, $N_2$ is the second digit of the serial number, and so on. The check digit may then be taken as the least significant digit of the result. Thus, for a serial number 22312313, the result of the predetermined mathematical operation is 2*(2+2+3+1)+3*(2+3+1+3)=16+27=43. The check digit is the least significant digit; that is the check digit is 3. Accordingly, the number appearing on the product would be 223123133, wherein the last digit is the check digit. For serial number 10532641, the check digit is 7[2*(1+0+5+3)+3*(2+6+4+1)= 18+39=57], and the number appearing on the product would be 105326417.

The particular mathematical operation used in connection with the check digit is not critical to the present invention. Any predetermined mathematical operation may be used to obtain the check digit. Indeed, for added security, it is possible to utilize more than one check digit, wherein each check digit is calculated by a different mathematical operation. Whatever mathematical operation is used, however, it is desirable to minimize the number of individuals with knowledge of the specific operation to reduce the risk of false serial numbers being generated.

Once the serial number is verified (block 108), a local database may be updated with the serial number information and any other necessary or desired information (block 110). At minimum, however, the local database should include an indication of the date on which the transaction took place. Other information might include the price paid, the store associate responsible for the sale, and the like.

The serial number of the individual product is printed (block 112) as part of a written customer transaction receipt. As shown in the sample sales receipt 30 of FIG. 3, the serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. In the example operation illustrated in FIG. 2 and the sample sales receipt of FIG. 3, the date is printed at the end of the sales receipt 30 (block 116). For ease of viewing, the serial number and date on the sample receipt 30 are indicated by boxes. If desired, an actual printed receipt may also have such information highlighted, for example, by a different color ink.

Turning back to the example operation illustrated in FIG. 2, after the serial number is printed, a check is made to determine whether sales are complete (block 114). Ordinarily, this will be based on the store associate hitting a TOTAL button on the cash register. If sales are not complete, control returns to block 100 for entry of a SKU number for the next product. Otherwise, sales totals are calculated and printed on the receipt along with the current date (block 116). Thereafter, the central computer system 14 is contacted and the general database 16 is updated.

It should be emphasized that the operation illustrated in FIG. 2 is merely exemplary, and that the steps need not be performed in the particular order shown. For example, all print operations and database updates can take place after sales are completed. Additionally, it is not necessary to update the databases on an item-by-item basis. Indeed, efficiency and speed in updating the general database may be increased by batching transactions in groups of, for example, fifteen transactions.

Figure 4:
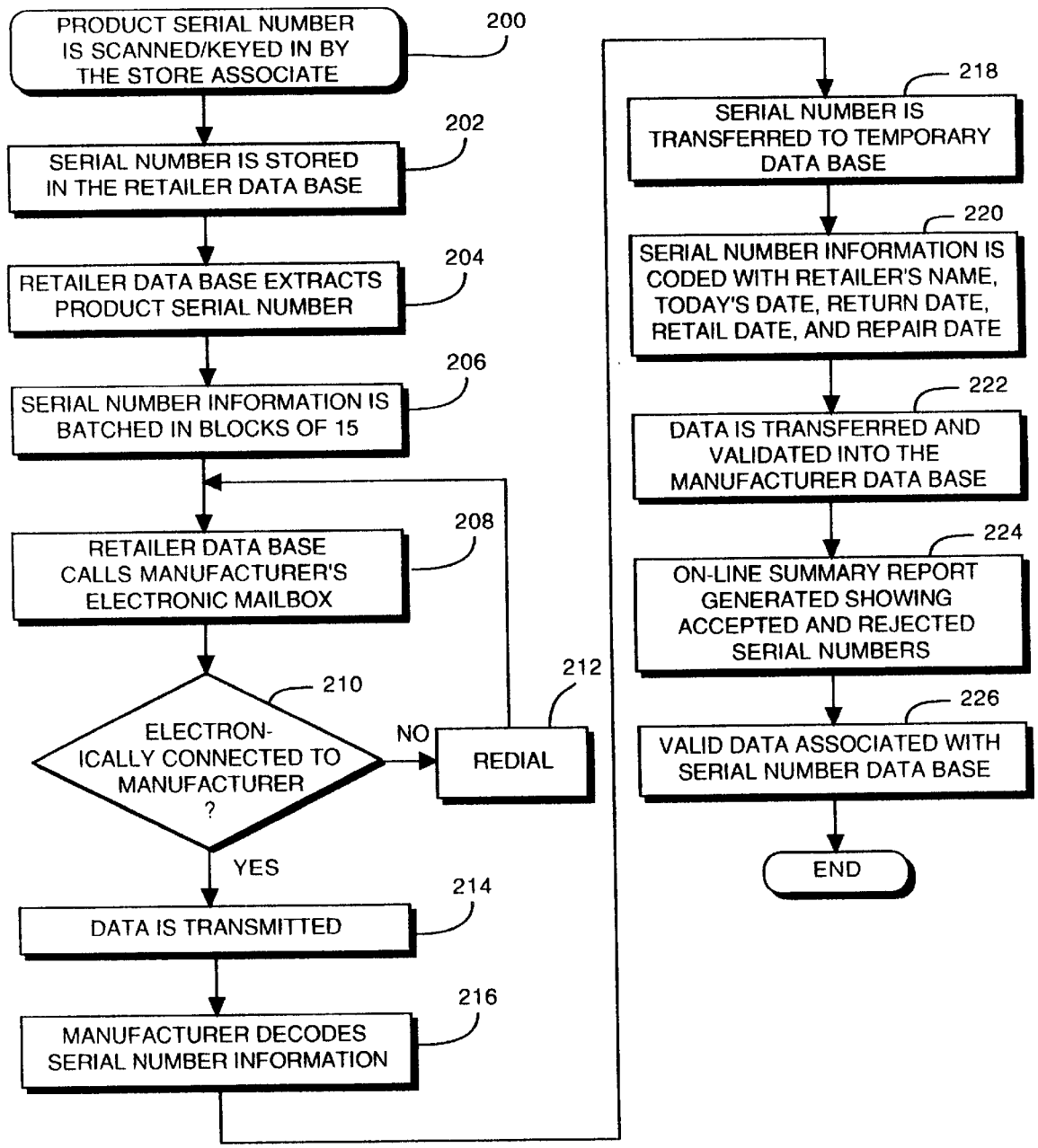
FIG. 4 illustrates an example flow chart for an electronic data interface between a product retailer and a product manufacturer.

An example technique for interfacing the local computer system 6 to the central computer system 14 is illustrated in FIG. 4. Product serial numbers are scanned or keyed in by a store associate (block 200) and stored with associated information in the local database (block 202) using an operation such as discussed in connection with FIG. 2. Thereafter, the local computer system 6 extracts the serial number information from the database (block 204) and batches the information in blocks of fifteen (block 206). The operations represented by blocks 204 and 206 are preferably performed periodically, for example, daily.

Once the serial number information is properly batched (block 206), the local computer system 6, in this case a retailer system, dials the general computer system 14, in this case a manufacturer's computer system, to make an electronic link to an electronic mailbox set up for that particular retailer (block 208). A separate electronic mailbox may be set up for each manufacturer account. The connection is tested (block 210) and, if the connection is not properly established, the retailer computer system 6 redials (block 212) until a proper connection is established. At that point, data is transmitted (block 214) to the electronic mailbox. Batching the information increases transmission speed and, therefore, reduces data transmission times.

Data communications between the retailer system and the manufacturer system may use a conventional communications format. For example, the computer systems may be equipped with an EDI Translator capable of using the Standard 140 file format established by the EIA. The Standard 140 file format is specifically designed to extract product registration information. A typical transmission would begin with a Transaction Set Header to indicate the start of a transaction and to assign a control number. This would be followed by a Beginning Segment for Product Registration which indicates the beginning of a product registration transaction set and transmits identifying numbers, dates and times. The identifying numbers may include a Purpose Code to identify the type of registration (e.g., original sale or return to stock) and a Reference Number assigned by the user for the particular transaction. Next, a Name segment is transmitted to identify the user by type of organization, name and identifier code. The identifier code may indicate an organizational entity, a physical location, or an individual.

If desired, additional identifying segments such as an Address Information segment and a Geographic Location segment may be transmitted. The address information would include, for example, a street number and name for the individual store. The geographic location information would include the city name, a state or province code as defined by an appropriate Government agency, a postal code (e.g., a zip code in the United States), and a country code.

Following any desired additional identifying segments, specific item identification information (e.g., serial numbers) may be transmitted along with a textual description of the product if desired. Information identifying the individual store that sold the particular item may be associated with the information for that item. Appropriate dividers would be provided to separate the information for the respective individual items. After the individual item information has been transmitted completely, a Transaction Set Trailer segment may be transmitted to indicate the end of the transaction set and provide the count of transmitted segments.

Returning now to FIG. 4, the manufacturer computer system 14 decodes the serial number information received form the retailer (block 216). The decoded serial number information is initially stored in a temporary database (block 218) and the serial number information is encoded with the retailer's name, the registration date, the sale date, the last date on which returns will be accepted, and the last date for warranty repairs (block 220). The individual serial numbers may then be validated using the check digit technique discussed above, and the data is transferred to the manufacturer's general database (block 222).

Following validation of the serial numbers, an on-line summary report may be generated which lists all accepted and rejected serial numbers (block 224). The valid data is then stored in the manufacturer's national serial number database.

The summary report provided in block 224 provides a tool for the manufacturer to locate trouble spots caused, for instance, by malfunctioning retailer systems or attempted fraud. Additional monitoring reports may also be generated as desired. For example, the serial number pass/fail ratio for all returns by a particular retailer over a given time period may be reported, duplicate serial numbers may be located and listed, previously registered serial numbers may be flagged, and cross-references may be made between the registration date and the date the product was returned to the manufacturer. Such reports can be used by the manufacturer to monitor retailer returns for possible problems or abuse.

Figure 5:
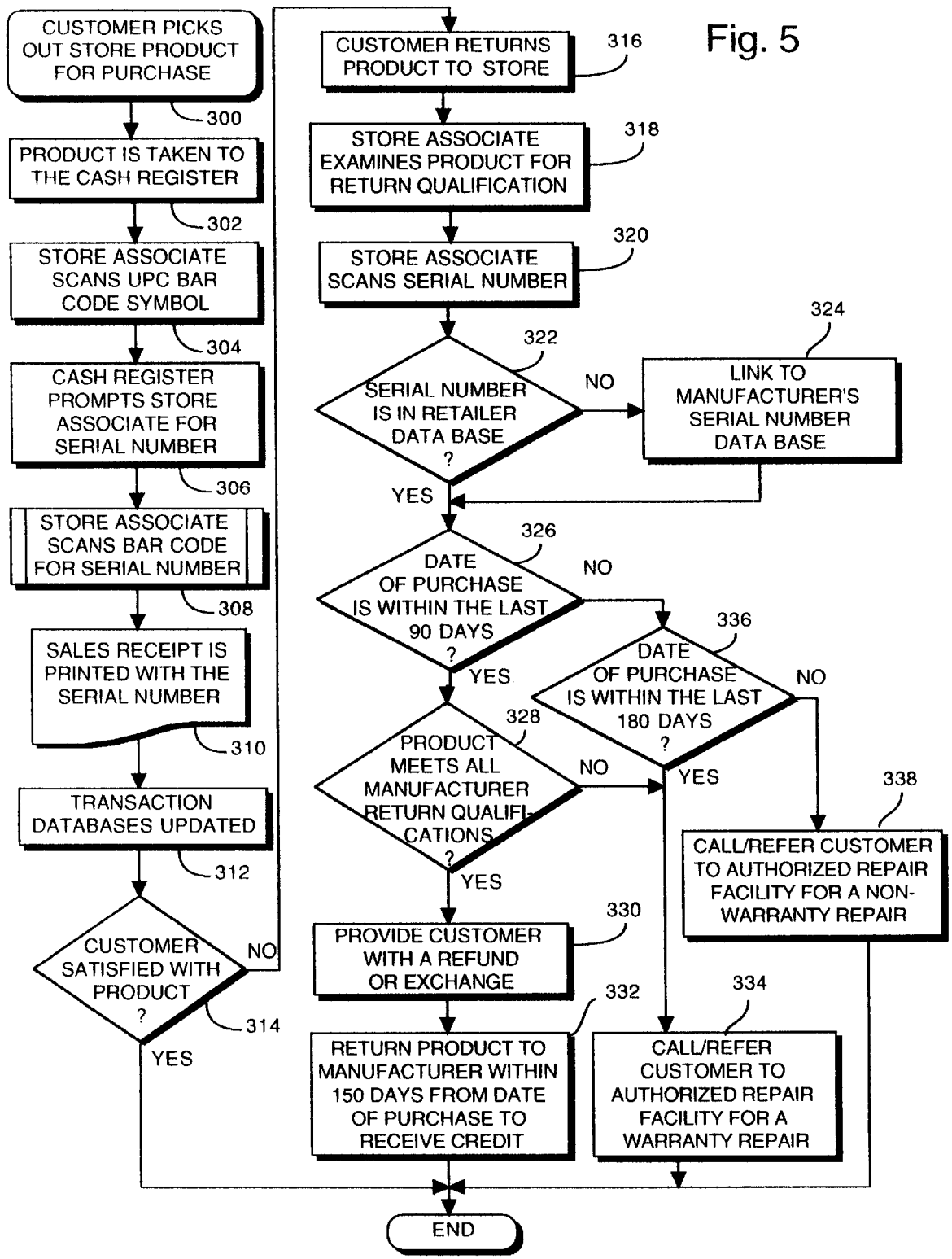
FIG. 5 illustrates an example flow chart generally illustrating steps which may be taken in connection with product registration and return.

FIG. 5 illustrates in flow chart form an example purchase and return process made possible by the electronic registration system of the present invention. A store customer first picks out a store product for purchase (block 300) and brings it to the check out station (block 302). The store associate then scans the UPC code to enter the product SKU number (block 304) and, if it is a product for which electronic registration is sought, the store clerk is prompted to enter the serial number (block 306).

After the store clerk scans the serial number (block 308), the customer sales receipt is printed with the serial number (block 310) and the transaction databases are updated (block 312). The process ends if the customer is satisfied with the product (block 314). If not, however, the customer returns the product to the store (block 316).

As noted previously, if the customer presents the sales receipt at the time of a return, the store associate may compare the serial number on the product with that on the sales receipt. The associate should compare the printed serial number with that on the product itself, rather than the serial number on the packaging, to guard against repackaging of an old product in a box for a recently purchased product. If the serial numbers match, the return is within an allowable time period, and all other return qualifications are met (e.g. no major parts are missing, etc.) the return may be accepted.

If there is no receipt, or if the product serial number does not match that printed on the receipt, the store associate examines the products to ensure all return qualifications are met (block 318). If so, the store associate scans the serial number on the product (block 320) and the retailer computer system 6 checks the retailer database for the serial number (block 322). A link to the manufacturer's serial number database may be made to search for serial numbers which do not appear in the retailer database (block 324).

Assuming the serial number information is found in either the retailer database or the manufacturer database, the date of purchase is checked to see if it was within the past 90 days (block 326). Purchases within the past 90 days which meet all other manufacturer return qualifications (block 328) may be refunded or exchanged (block 330). The retailer may then return the product to the manufacturer within 150 days from the date of purchase to receive credit for the return (block 332).

For products which do not meet all manufacturer return qualifications (block 328), but were purchased within the past 90 days (block 326), the consumer may be referred to an authorized repair facility for a warranty repair (block 334). Similarly, if the purchase was made more than 90 days (block 326), but fewer than 180 days (block 336), prior to the return, the customer will be referred to an authorized repair facility for a warranty repair (block 334). Consumers seeking to return products purchased more than 180 days earlier (block 336) will be directed to an authorized repair facility for a non-warranty repair (block 338).

The return deadlines noted in the example of FIG. 5 are fairly typical for actual return policies. However, these particular deadlines are merely examples, and other appropriate deadlines may be used without departing from the spirit of the invention.

Figure 6:
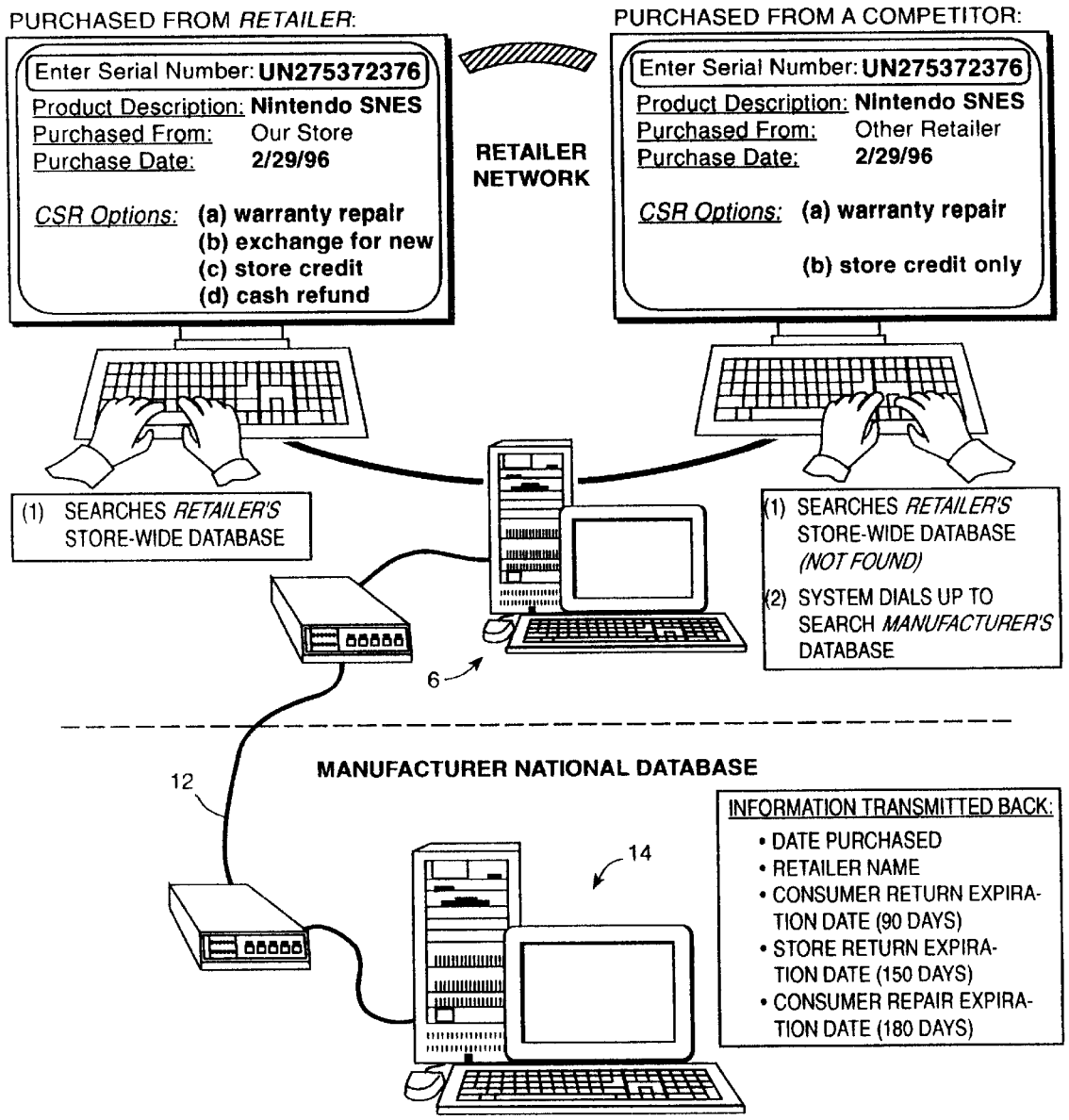
FIG. 6 illustrates an example of a procedure at a retailer for determining whether a product return is properly under warranty.

FIG. 6 provides a graphic illustration of a return process which utilizes the features of an electronic registration system. As illustrated at the left hand portion of FIG. 6, when a customer seeks to return a product, the store associate searches the retailer's store-wide database by entering the product serial number. If the transaction is located in the store-wide database, the operator terminal 12 of the retailer computer system 6 displays the product description the purchase location, and purchase date. Additionally, the consumer's return options (e.g., warranty repair, exchange, store credit, or cash refund) may be displayed. The display of consumer options is particularly advantageous where electronic registration is used for multiple manufacturers. By displaying the options, the need for the store clerk to remember or look up the options is avoided. Also, the likelihood of the store associate making a mistake is reduced.

The right hand portion of FIG. 6 illustrates a situation where the product was purchased from a competitor and, thus, does not appear in the storewide database. After unsuccessfully searching the store-wide database, the retailer computer system dials up to search the manufacturer's national database. The manufacturer's computer system returns the date purchased, the name of the retailer that sold the product, the deadline for consumer returns, the deadline for the retailer to return the product to the manufacturer for credit, and the deadline for warranty repairs. Based on this information from the manufacturer, the operator terminal 12 of the retailer computer system 6 displays the product description, the purchase location and date, and available consumer options.

The implementations described above illustrate the characteristics, features and advantages of the present invention. These implementations, of course, are not exhaustive, and other implementations within the scope and spirit of the present invention will be apparent to those skilled in the art. Although the invention is described primarily in the context of a two-level retailer/manufacturer arrangement, other arrangements are available. For example, a three-level individual chain store/store headquarters/manufacturer arrangement may be implemented. Yet further levels may be added.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A computer implemented method for registering product transactions and providing information upon request concerning the product transactions, comprising:

obtaining, at a transaction location, individual product identification information which individually identifies the specific item involved in the transaction for each item of a product type for which registration of individual product transactions is sought;

communicating the individual product identification information to at least one transaction database for inclusion in the at least one transaction database;

updating the at least one transaction database with the individual product identification information along with additional information including at least a date associated with the transaction; and receiving, upon inquiry to the at least one transaction database, return qualification information forn the at least one transaction database for use in determining return qualification of the specific item.

2. The method of claim 1, wherein communicating the individual product identification information includes communicating the date associated with the transaction.

3. The method of claim 2, wherein communicating the date associated with the transaction is communicating the date of the transaction.

4. The method of claim 1, wherein obtaining includes:

identifying the type of product involved in the transaction;

determining whether the product is of a type for which registration of individual product transactions is sought; and obtaining the individual product identification information if the product type is of a product for which registration of individual product transactions is sought.

5. The method of claim 4, wherein identifying includes obtaining a universal product code (UPC) symbol for the product.

6. The method of claim 1, wherein obtaining individual product identification information includes obtaining at least a serial number.

7. The method of claim 6, wherein obtaining the serial number includes scanning the serial number represented in a bar code format.

8. The method of claim 6, wherein scanning includes scanning the serial number that includes a check digit for use in verifying the validity of the serial number.

9. The method of claim 1, further including verifying the validity of the individual product identification information substantially at the time of the transaction.

10. The method of claim 9, further including rejecting the individual product identification information when the individual product identification information is not validated and, subsequently, repeating obtaining individual product identification information at the location of the transaction.

11. The method of claim 9, wherein verifying the validity of the individual product identification information includes verifying a serial number including a check digit.

12. The method of claim 1, wherein receiving information from the at least one transaction database for use in determining return qualification of the specific item is receiving a date associated with the transaction.

13. The method of claim 1, wherein the at least one transaction database is associated with a registration computer system having available return qualification information pertaining to the specific item involved in the transaction and wherein receiving includes receiving original transaction information including at least a date associated with the transaction along with return qualification information pertaining to the specific item.

14. A system for registering product transactions to reduce the number of unauthorized returns of products sold by retailers, the system comprising:

an input device which, at a transaction location, obtains individual product identification information that individually identifies the specific item involved in the transaction for each item of a product type for which registration of individual product transactions is sought;

a communication channel operable to communicate the individual product identification information to a transaction database for inclusion in the transaction database along with additional information relating to the particular product transaction including at least a date associated with the transaction;

a memory which stores data for the transaction database, the data including the individual product identification information and the date associated with the transaction; and a processor which, upon request, accesses the transaction database to retrieve return qualification information associated with a particular product transaction and causes at least a portion of the return qualification information stored in the memory to be retrieved along with the additional information relating to the particular product transaction.

15. The system of claim 14, wherein the communication channel establishes an electronic link with a computer system at a location remote from the transaction.

16. The system of claim 15, wherein the electronic link is established over commercial communication systems.

17. The system of claim 15, wherein the electronic link is established over dedicated lines.

18. The system of claim 15, wherein the electronic link is established through electromagnetic transmissions.

19. The system of claim 14, wherein the input device is a scanner.

20. The system of claim 14, further including a display device controlled to prompt a system user to obtain the individual product identification information with the input device for each item of a product type for which registration of individual product transactions is sought.

21. The system of claim 20, further including a verification device which evaluates the individual product identification information from the input device and rejects invalid information.

22. The system of claim 21, wherein the individual product identification information includes at least a serial number and wherein the verification device utilizes a check digit to evaluate the validity of the serial number obtained from the input device.

23. The system of claim 14, further including a recorder which creates a transaction receipt that identifies the individual product information and the date associated with the transaction.

24. A computer assisted method for registering product transactions and providing information upon request concerning the product transactions, comprising:
   obtaining, at a transaction location, individual product identification information which individually identifies the specific item involved in the transaction;
   verifying the validity of the individual product identification information substantially at the time of the transaction;
   communicating valid individual product identification information to a transaction database for inclusion in the transaction database;
   updating the transaction database with the valid individual product identification information along with additional information including at least a date associated with the transaction; and
   receiving, upon inquiry to the transaction database, information from the transaction database for use in determining return qualification of the specific item.

25. The method of claim 24, wherein communicating includes communicating the date associated with the transaction along with the valid individual product identification information.

26. The method of claim 25, wherein communicating the date associated with the transaction date is communicating the actual date of the transaction.

27. The method of claim 24, wherein obtaining includes:
   identifying the type of product involved in the transaction;
   determining whether the product is of a type for which registration of individual product transactions is sought; and
   obtaining individual product identification information if the product type is that of a product for which registration of individual product transactions is sought.

28. The method of claim 27, wherein identifying includes obtaining a universal product code (UPC) symbol for the product.

29. The method of claim 24, wherein obtaining individual product identification information includes obtaining at least a serial number.

30. The method of claim 29, wherein obtaining the serial number is scanning the serial number represented in a bar code format.

31. The method of claim 29, wherein obtaining the serial number includes obtaining the serial number having a check digit for use in verifying the validity of the serial number.

32. The method of claim 24, further including rejecting the individual product identification information when the individual product identification information is not validated and, subsequently, repeating obtaining individual product identification information at the location of the transaction.

33. The method of claim 24, wherein obtaining individual product identification information includes obtaining at least a serial number having a check digit for use in verifying the validity of the individual product identification information.

34. The method of claim 24, wherein receiving information from the transaction database for use in determining return qualification of the specific item is receiving a date associated with the transaction.

35. The method of claim 24, wherein communicating valid individual product identification information to the transaction database includes communicating to the transaction database associated with a registration computer system having available return qualification information pertaining to the specific item involved in the transaction and wherein receiving includes receiving original transaction information including at least the date associated with the transaction along with return qualification information pertaining to the specific item.

36. A computer implemented method for registering product transactions and providing information upon request concerning the product transactions, comprising:
   obtaining, at a transaction location, individual product identification information which individually identifies the specific item involved in the transaction for each item of a product type for which registration of individual product transactions is sought;
   communicating the individual product identification information to a transaction database associated with a registration database having available further information relating to particular product transactions, for inclusion in the transaction database;
   updating the transaction database with the individual product identification information along with additional information including at least a date associated with the transaction; and
   receiving, upon inquiry to the transaction database, information from the transaction database for use in determining return qualification of the specific item and receiving the frther information relating to the product transaction.

37. A computer assisted method for registering product transactions and providing information upon request concerning the product transactions, comprising:
   obtaining, at a transaction location, individual product identification information which individually identifies the specific item involved in the transaction for each item of a product type for which registration of individual product transactions is sought;
   communicating the individual product identification information to a transaction database, for inclusion in the transaction database;
   updating the transaction database with the individual product identification information along with additional information including at least a date associated with the transaction;

receiving, upon inquiry to the transaction database, information from the transaction database for use in determining return qualification of the specific item; and checking a registration database having available returns policy information relating to particular products in order to determine return qualification of the specific item.

38. The method of claim 37, wherein checking a registration database includes checking a registration database stored on a computer.

39. The method of claim 37, wherein checking a registration database includes checking a registration database stored in printed form.

40. A system for registering product transactions to reduce the number of unauthorized returns of products sold by retailers, comprising:

an input device which obtains, at a transaction location, individual product identification information which individually identifies a specific item involved in the transaction;

a verification device which evaluates the individual product identification information from the input device at a time of the transaction and rejects invalid information; and at least one memory which stores a transaction database, the transaction database being updated with transaction information including at least individual product identification information that has been validated by the verification device and additional information relating to the transaction including at least a date associated with the transaction, the memory being associated with a registration computer system having available return qualification information pertaining to the specific item involved in the transaction, whereby at the time of a product return transaction, the registration computer system locates and provides original transaction information concerning a returned product and applicable return qualification information.

41. The system of claim 40, wherein the verification device rejects invalid individual product identification information and wherein the input device again obtains individual product identification information when the verification device rejects individual identification information previously obtained by the input device.

42. The system of claim 41, wherein the individual product identification information includes at least a serial number represented in a bar code format and wherein the input device is a bar code scanner.

43. The system of claim 40, wherein the input device obtains individual product identification information for each item of a product type for which registration of individual product transactions is sought.

44. The system of claim 43, wherein the input device obtains a universal product code (UPC) for identification of the type of product involved in the transaction.

45. The system of claim 40, wherein the individual product identification information includes at least a serial number and wherein the verification device utilizes a check digit to evaluate the validity of the serial number obtained from the input device.

46. The system of claim 40, further including a communication channel operable to communicate the individual product information to the at least one memory.

47. The system of claim 46, wherein the communication channel establishes an electronic link with a computer system at a location remote from the transaction.

48. The system of claim 47, wherein the electronic link is established over commercial communication systems.

49. The system of claim 47, wherein the electronic link is established over dedicated lines.

50. The system of claim 47, wherein the electronic link is established through electromagnetic transmissions.

51. The system of claim 40, wherein the input device is a scanner.

52. The system of claim 40, further including a display device controlled to prompt a system user to obtain the individual product information with the input device for each item of a product type for which registration of individual product transactions is sought.

53. The system of claim 40, further including a recorder which creates a transaction receipt that identifies the individual product information and a transaction date.

54. A system for registering product transactions to reduce the number of unauthorized returns of products sold by retailers, comprising:

means for obtaining, at a transaction location, individual product identification information which individually identifies the specific item involved in the transaction for each item of a product type for which registration of individual product transactions is sought;

means for communicating the individual product identification information to at least one transaction database for inclusion in the transaction database;

means for updating the transaction database with the individual product identification information along with additional information including at least a date associated with the transaction; and means for receiving, upon inquiry to the transaction database, information from the transaction database for use in determining return qualification of the specific item.

55. A computer implemented method to provide prompt and efficient handling of a return of a particular item purchased by a customer at a point of sale location, comprising:

collecting, substantially at the time the customer purchases the particular item at the point of sale location, at least one code that individually identifies the specific item and differentiates said particular item from other, similar items not purchased by said customer;

electronically communicating the collected identification code via an electronic communications link to a computer system that maintains a return qualification database;

updating the return qualification database with the communicated identification code; and handling a return request for the specific item based at least in part on the contents of said updated return qualification database.

56. A method as in claim 55 further including storing, in said return qualification database, at least one further code indicating when said item was purchased by the customer.

57. A method as in claim 55 wherein said handling step includes electronically communicating, from said computer system to said point of sale location over the same or different electronic communications link, an indication as to whether said particular item is qualified for acceptance as a return.

58. A system for registering product transactions to reduce the number of unauthorized returns of products sold by retailers, said system comprising:

- a data obtaining device that obtains, at a transaction location, individual product identification information which individually identifies a specific item involved in said transaction;
- a verifier, operatively coupled to said data obtaining device, that verifies validity of the individual product identification information from said data obtaining device at a time of the transaction; and
- a registration computer system, operatively coupled to receive said verified individual product identification information, said registration computer system having available return qualification information pertaining to the specific item involved in the transaction, said registration computer system having a general transaction database associated therewith, said registration computer system updating said general transaction database in response to original transaction information including at least said individual product identification information that has been validated by said verifier and additional information relating to the transaction including at least a date associated with the transaction, said registration computer system locating and providing, at the time of a product return transaction, original transaction information concerning a return product and applicable return qualification information.

\* \* \* \* \*

UNITED STATES PATENT AND TRADEMARK OFFICE

CERTIFICATE OF CORRECTION

PATENT NO.     : 5,978,774
DATED          : November 2, 1999
INVENTOR(S)    : ROGERS et al.

It is certified that error appears in the above-identified patent and that said letters patent is hereby corrected as shown below:

Title page, item [73], "American" should be --America--.

Column 9, claim 1, line 57, "forn" should be --from--.

Signed and Sealed this

Twenty-fifth Day of July, 2000

Attest:

Attesting Officer

Q. TODD DICKINSON
Director of Patents and Trademarks